May 29, 1945. B. F. PEASE, JR Re. 22,647
LUBRICATING DEVICE
Original Filed Feb. 20, 1941
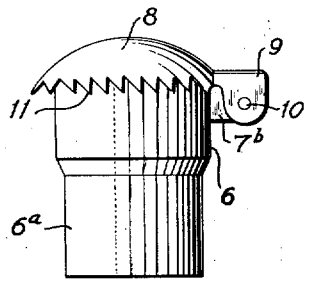
Fig. 1.
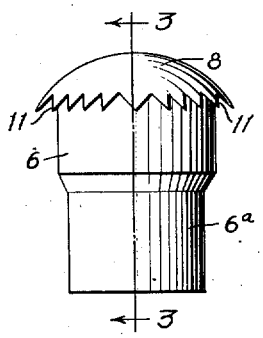
Fig. 2.
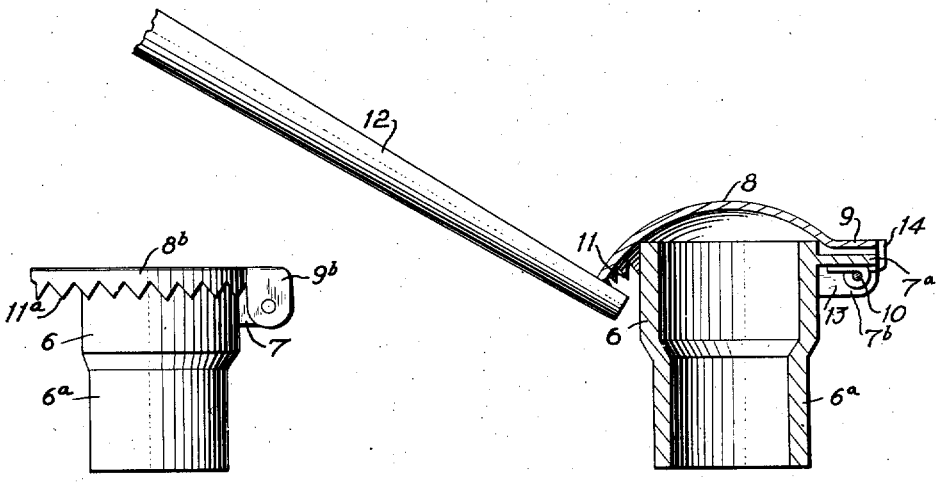
Fig. 4.
Fig. 3.
INVENTOR
BENJAMIN F. PEASE, JR.
BY
Chas. T. Hawley
ATTORNEY Reissued May 29, 1945

Re. 22,647

UNITED STATES PATENT OFFICE 22,647

LUBRICATING DEVICE

Benjamin F. Pease, Jr., Grafton, Mass.

Original No. 2,335,442, dated November 30, 1943, Serial No. 379,782, February 20, 1941. Application for reissue November 29, 1944, Serial No. 565,678

7 Claims. (Cl. 184—91)

This invention relates to improvements in oil cups and similar lubricating devices and to an improved cap for closing the upper ends thereof.

Electric motors and other machinery are now equipped with oil cups in the form of a short tube which is threaded or otherwise secured in a bore leading to the part to be lubricated. Such oil cups are provided with a normally-closed, spring-operated lid which serves to exclude dust or any objectionable matter from the tube. These lids, as ordinarily constructed, have a relatively smooth lower face which cannot be conveniently engaged by an oil spout to open the lid and hold it in an open position while oil is being fed to the tube, and it is necessary to use both hands during the oiling operation.

Objects of this invention are to provide an oil cup or tube of simple, economical construction having a lid which is provided on the circumferential edge thereof with depending teeth for engaging the spout of an oil can, whereby the oil can can be used with one hand to open the lid and hold it in an open position while oil is fed from the spout to the tube.

The above and other objects and advantages are accomplished by the novel construction, combination, and arrangement of parts illustrated and hereinafter described with reference to the particular adaptation thereof disclosed in the drawing, it being understood that the invention is not confined to the exact form illustrated and that changes and modifications may be made which come within the scope of the claims hereunto appended.

In the drawing,

Figure 1 is a side, elevational view of an oil cup construction in accordance with this invention, Figure 2 is a side, elevational view of same, Figure 3 is a vertical, sectional view taken as indicated by the line 3—3 of Figure 2, and Figure 4 is a side, elevational view showing a modified form of the invention.

In the particular adaptation of the invention shown in the drawing, the numeral 6 is employed to denote a tube which is provided with a reduced lower end portion 6a which may be threaded or otherwise secured in a bore leading to a bearing or other part to be lubricated. The tube 6 is provided adjacent the upper end thereof with a lug 7 which projects from the rear side thereof. The lug 7 may be of any suitable construction but as shown is provided with an upper wall 7a and side walls 7b which depend therefrom to form an open ended cavity for receiving a spring to be hereinafter described.

The numeral 8 denotes a lid which in Figures 1, 2, and 3 is concavo-convex, with the concave side thereof presented downwardly to engage the free end of the tube 6. The main portion of the lid 8 is larger than the upper end of the tube and the marginal portion thereof projects beyond and overhangs the wall of the tube when the lid 8 is in a closed position. The downwardly projecting marginal portion of the lid 8 is notched to provide teeth 11. In the drawing there is illustrated a lid 8 having a continuous row of teeth 11 which project downwardly from the forward and lateral sides of the lid. As shown in Figures 1 and 2, the teeth 11 are inclined rearwardly but it is understood that the teeth may be of any suitable form and arranged in any suitable manner which will accomplish the purposes of the invention.

The lid 8 is provided on the rearwardly presented edge thereof with an extension 9 having depending side walls which embrace the lug 7. The side walls of the lug 7 and the side walls of the extension 9 are provided with aligned bores in which a pin 10 is received to hingedly connect the cap 8 in an operative position on the tube 6. A spring 14 is mounted on the pin 10 and positioned in the cavity 13 with one end thereof engaging the rear edge of the extension 9 to normally hold the lid 8 in a closed position.

In Figure 4 there is shown a flat lid 8b having a flange depending from the outer edge thereof. The flange is provided with depending teeth 11a which serve the same purpose as the teeth 11.

In use the spout 12 of an oil can or other device is positioned under the projecting edge of the cap 8. The spout 12 is then moved upwardly to open the lid 8 and oil is forced from the spout 12 into the tube 6. The teeth 11 engage the spout 12 to prevent unintentional slipping of the spout from the lid during the oiling operation.

For the most successful and convenient operation, the depending teeth should be substantially spaced from the tubular wall of the stem, so that the teeth may have reliable engagement with the oil spout and so that slipping of the oil spout from under the lid may be avoided.

It will thus be seen that the lid can be easily and conveniently operated and oil placed in the tube 6 without using both hands.

Having thus illustrated my invention and described the same in detail, I claim:

1. In an oiling device, a tubular stem, a lid hinged to said stem to close the open end thereof, the free edge portion of said lid projecting beyond said stem and a series of closely spaced depending teeth extending along substantially the entire circumferential edge of said free edge portion.

2. In an oiling device, a tubular stem, a lid hinged thereto to close the open end thereof, the circumferential edge of said lid overhanging said open end, and teeth depending from said circumferential edge throughout substantially the entire free portion thereof.

3. In an oiling device, a tubular stem, a lid hinged to one side thereof, said lid operable to close the open end of said stem, means yieldably holding said lid in a closed position, the circumferential edge of said lid projecting beyond said stem, and teeth depending from substantially the entire free portion of said circumferential edge in spaced relation to said stem.

4. In a lubricating tube, a tubular stem, a lid hinged thereto and projecting beyond the side walls thereof, and rearwardly inclined teeth depending from substantially the entire free circumferential edge of said lid.

5. In a lubricating tube, a tubular body, a lid hinged thereto for movement to and from the open end thereof, a spring yieldably holding said lid in a closed position on said open end and a series of teeth projecting downwardly from the free circumferential edge of said lid for engaging an oil delivery spout, said teeth inclined in the circumferential plane of said edge, toward the hinged end of said lid.

6. In a lubricating device, a tubular stem, a lid pivotally connected to said stem to close the open end thereof, the free edge portion of said lid projecting beyond said stem, and a series of teeth depending from said free edge portion of said lid and with their inner surfaces substantially spaced radially outward from the outer wall of said tubular stem.

7. In a lubricating device comprising a tubular stem and a lid pivotally connected to and normally closing said stem and having a projecting free edge portion, that improvement which consists in providing a series of teeth depending from said free edge portion of said lid and with their inner surfaces substantially spaced radially outward from the outer wall of said tubular stem for effective and reliable engagement by an oil spout inserted thereunder.

BENJAMIN F. PEASE, JR.